(12) United States Patent
Hasegawa et al.

(10) Patent No.: US 9,048,030 B2
(45) Date of Patent: Jun. 2, 2015

(54) WOUND ELECTROCHEMICAL DEVICE

(75) Inventors: Hiroaki Hasegawa, Tokyo (JP);
Kiyonori Hinoki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 53 days.

(21) Appl. No.: 13/591,597

(22) Filed: Aug. 22, 2012

(65) Prior Publication Data
US 2013/0052499 A1 Feb. 28, 2013

(30) Foreign Application Priority Data

Aug. 29, 2011 (JP) ................. 2011-186230

(51) Int. Cl.
| | |
|---|---|
| *H01M 4/00* | (2006.01) |
| *H01G 11/74* | (2013.01) |
| *H01M 10/04* | (2006.01) |
| *H01M 10/052* | (2010.01) |
| *H01M 10/0587* | (2010.01) |
| *H01G 11/76* | (2013.01) |

(52) U.S. Cl.
CPC ........... *H01G 11/74* (2013.01); *H01M 10/0431* (2013.01); *H01M 10/052* (2013.01); *H01M 10/0587* (2013.01); *H01G 11/76* (2013.01); *Y02E 60/122* (2013.01); *Y02E 60/13* (2013.01)

(58) Field of Classification Search
CPC . H01M 2/263; H01M 6/10; H01M 2006/106; H01M 10/0409; H01M 10/0431; H01M 10/0587; H01M 10/125; H01M 10/286
USPC .................................. 429/94, 245
See application file for complete search history.

(56) References Cited

U.S. PATENT DOCUMENTS

| | | | |
|---|---|---|---|
| 2001/0046623 A1* | 11/2001 | Akahira ..................... 429/94 |
| 2004/0161662 A1* | 8/2004 | Kim et al. .................. 429/94 |
| 2004/0161670 A1* | 8/2004 | Kawase et al. ............. 429/245 |
| 2007/0117015 A1* | 5/2007 | Yamamoto et al. ....... 429/231.8 |
| 2009/0317713 A1* | 12/2009 | Kim et al. .................. 429/164 |
| 2010/0035144 A1 | 2/2010 | Oh et al. |
| 2011/0014510 A1* | 1/2011 | Miyahisa et al. ............ 429/94 |

FOREIGN PATENT DOCUMENTS

| | | |
|---|---|---|
| JP | 2001-210381 A | 8/2001 |
| JP | A-2002-343411 | 11/2002 |
| JP | 2006-260892 A | 9/2006 |
| JP | 2010-3697 A | 1/2010 |

\* cited by examiner

*Primary Examiner* — Ula C Ruddock
*Assistant Examiner* — Lisa S Park Gehrke
(74) *Attorney, Agent, or Firm* — Oliff PLC (57) ABSTRACT

In an area where positive and negative electrode leads 11, 21 oppose each other through a separator 30 in a wound electrochemical device 1, active material layers are removed from surfaces of current collectors 10a, 20a, so as to form open areas 10e, 20e. Even if the active material layers are formed on the surfaces of the current collectors, surfaces opposing them through the separator are provided with the leads protected by insulating tapes, whereby the areas serving as the open areas originally have no function as a capacitor. Therefore, by removing the active material layers from areas having no function as a capacitor, the wound electrochemical device 1 can be made further thinner while inhibiting the capacity as a device from lowering.

2 Claims, 5 Drawing Sheets

WOUND ELECTROCHEMICAL DEVICE

BACKGROUND OF THE INVENTION

1. Field of the Invention

The present invention relates to a wound electrochemical device.

2. Related Background Art

Known as an example of electrochemical devices such as lithium ion batteries is a wound electrochemical device comprising band-like positive and negative electrodes, each having an active material applied to both faces of a current collector, wound in an overlying manner with a band-like separator interposed therebetween and respective leads attached thereto (see, for example, Japanese Patent Application Laid-Open No. 2002-343411).

SUMMARY OF THE INVENTION

There have recently been increasing demands for smaller wound electrochemical devices. In particular, there have been strong demands for thinning laminated wound electrochemical devices having a substantially elliptical cross section. However, the above-mentioned wound electrochemical device may fail to become sufficiently thin under the influence of the thickness of the leads attached to the positive and negative electrodes.

In view of the foregoing, it is an object of the present invention to provide a wound electrochemical device which can be made further thinner.

For achieving the above-mentioned object, the wound electrochemical device in accordance with one aspect of the present invention comprises a band-life first electrode having a first current collector, a first active material layer formed on both faces of the first current collector, and a first lead connected to a first exposed part of the first current collector free of the first active material layer; a band-like second electrode having a second current collector, a second active material layer formed on both faces of the second current collector, and a second lead connected to a second exposed part of the second current collector free of the second active material layer; and a band-like separator, the first and second electrodes being wound and overlaid such as to hold the separator therebetween; wherein the first exposed part has a first connection area for connecting with the first lead and a first open area adjacent thereto having a width greater than that of the second lead; wherein the second exposed part has a second connection area for connecting with the second lead and a second open area adjacent thereto having a width greater than that of the first lead; wherein the first and second exposed parts oppose each other through the separator; wherein the first lead opposes the second open area of the second exposed part through the separator; and wherein the second lead opposes the first open area of the first exposed part through the separator.

In this wound electrochemical device, the active material layers are removed from the surfaces of the current collectors of the first and second electrodes in the areas where the first and second leads oppose each other, so as to form the first and second open areas. The first lead opposes the second open area through the separator, while the second lead opposes the first open area through the separator. This can make the wound electrochemical device thinner than in the case where active material layers are disposed in the first and second open areas.

The wound electrochemical device may be configured such that the first active material layer is formed on both sides of the first exposed part, while the second active material layer is formed on both sides of the second exposed part.

In this case, the leads are connected to the respective band-like current collectors not at their end parts but near their centers. This can minimize the length of current paths throughout the electrodes, so as to suppress the resistance value as compared with the case where the leads are connected to the end parts of the current collectors.

The wound electrochemical device may have a flat cross section perpendicular to a winding axis of the first and second electrodes and separator, while the first and second exposed parts oppose each other through the separator extending longitudinally of the cross section.

When employed in a device having such a flat cross section, the structure of the present invention can make it thinner more effectively.

The present invention can provide a wound electrochemical device which can be made further thinner.

DESCRIPTION OF THE PREFERRED EMBODIMENTS

In the following, modes for carrying out the present invention will be explained in detail with reference to the accompanying drawings. In the explanation of the drawings, the same constituents will be referred to with the same signs while omitting their overlapping descriptions.

Figure 1:
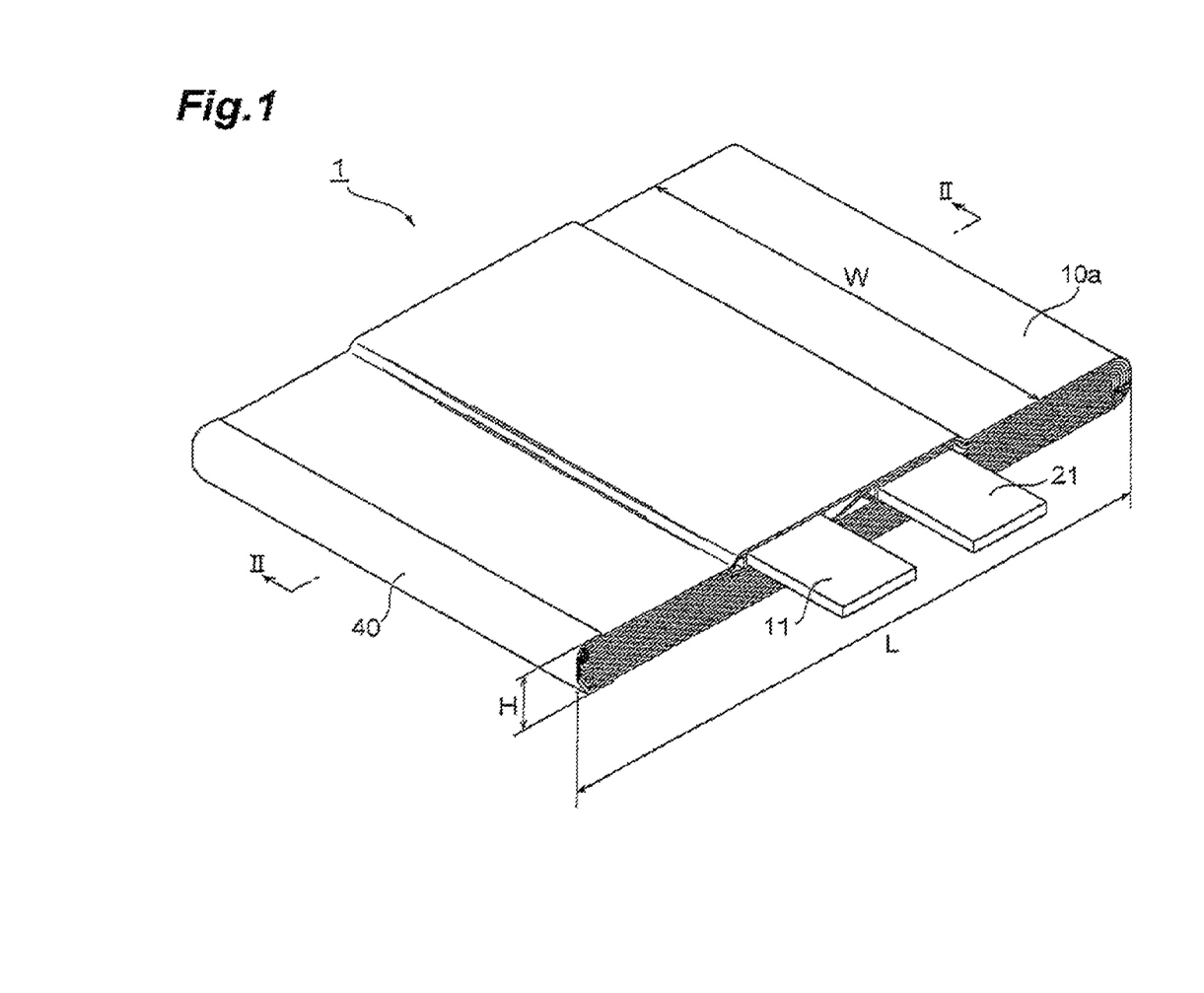
FIG. 1 is a perspective view illustrating the structure of a wound electrochemical device.
Figure 2:
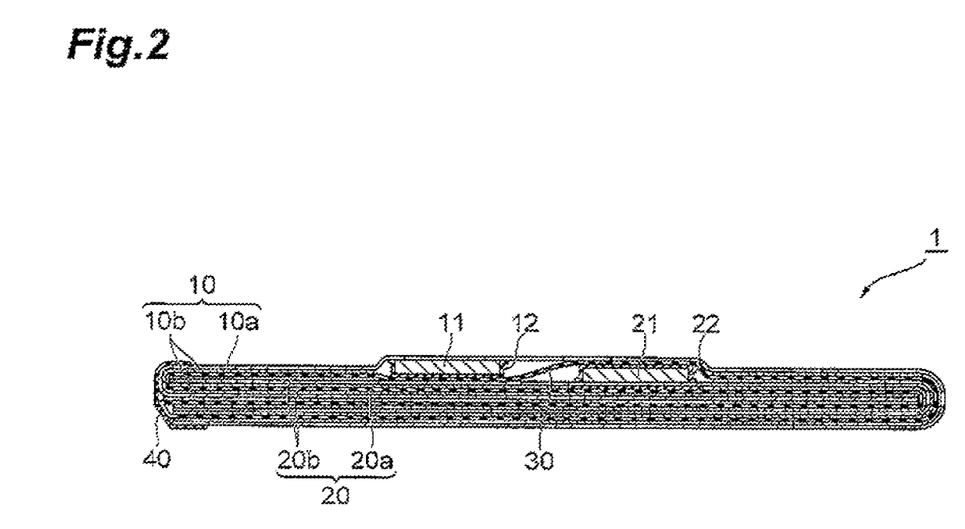
FIG. 2 is a schematic sectional view taken along the line II-II of the wound electrochemical device.

FIG. 1 is a perspective view illustrating the structure of a wound electrochemical device which is an embodiment of the present invention. FIG. 2 is a schematic sectional view taken along the line II-II of the wound electrochemical device, while FIG. 3 enlarges a part of FIG. 2. The wound electrochemical device 1 in accordance with this embodiment is a so-called capacitor device, in which a band-like positive electrode 10 (first electrode) and a band-like negative electrode 20 (second electrode) are wound flatly such as to hold a band-like separator 30 therebetween and fixed with an adhesive tape 40.

Figure 3:
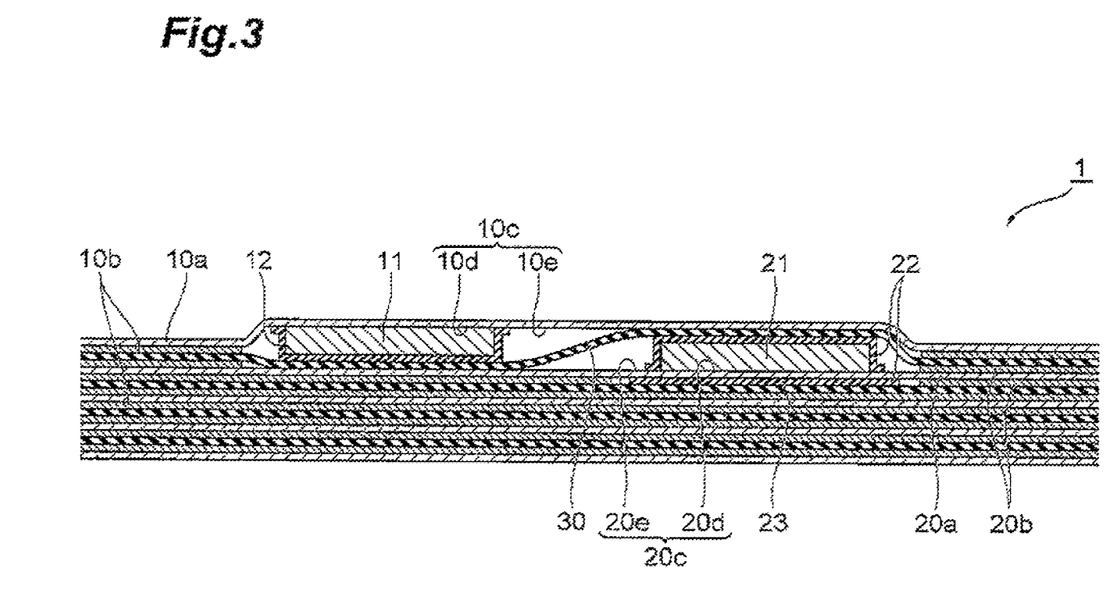
FIG. 3 enlarges a part of FIG. 2.

The positive electrode 10 is constructed by forming active material layers 10b (first active material layer) to become a cathode active material layer on both faces of a current collector 10a (first current collector) made of a metal foil, while a substantially flat positive electrode lead 11 is connected thereto so as to extend laterally of the band-like current collector 10a. The positive electrode lead 11 is connected by ultrasonic welding, cold pressure welding, or the like to an exposed part 10c on a surface of the current collector 10a free of the active material layer 10b. In the positive electrode lead 11, an area opposing the separator 30 is covered with an insulating tape 12. In the positive electrode 10, an area which does not oppose the negative electrode 20 through the separator 30 (e.g., an area on the outside of the wound body) is free of the active material layer 10b. The positive electrode lead 11 is disposed near the longitudinal center of the band-like current collector 10a in order to lower resistance. Hence, the active material layers 10b are formed on both sides of the area where the positive electrode lead 11 is connected.

Similarly, the negative electrode 20 is constructed by forming active material layers 20b (second active material layer) to become an anode active material layer on both faces of a current collector 20a (second current collector) made of a metal foil, while a substantially flat negative electrode lead 21 is connected thereto so as to extend laterally of the band-like current collector 20a. The negative electrode lead 21 is connected by ultrasonic welding, cold pressure welding, or the like to an exposed part 20c on a surface of the current collector 20a free of the active material layer 20b. In the negative electrode lead 21, an area opposing the separator 30 is covered with an insulating tape 22. As with the positive electrode lead 11, the negative electrode lead 21 is disposed near the longitudinal center of the band-like current collector 20a in order to lower resistance. Hence, the active material layers 20b are formed on both sides of the area where the negative electrode lead 21 is connected.

The insulating tapes 12, 22 attached to the positive and negative electrodes 11, 21 of the positive electrodes 10, 20 protect the surfaces of the positive and negative electrode leads 11, 21, respectively, and prevent the leads from penetrating through the separator 30 and thereby short-circuiting.

In the wound electrochemical device 1, structures of the positive and negative electrodes 11, 21 and thereabout will be explained later in detail.

The wound electrochemical device 1 is used for electric double-layer capacitors and the like. When the wound electrochemical device 1 is used for an electric double-layer capacitor, examples of materials used for the active material layers 10b, 20b include acetylene black, graphite, and activated carbon. Examples of electrolytic solutions for use include solutions of quaternary ammonium salts such as tetraethylammonium tetrafluoroborate in organic solvents such as propylene carbonate, diethyl carbonate, and acetonitrile. As the current collectors 10a, 10b, copper, aluminum, nickel, and the like shaped like a band are used, for example.

As the separator 10, one formed from an insulating porous body can be used, for example. Examples of the insulating porous body include single-layer or multilayer bodies of films made of polyolefins such as polyethylene and polypropylene, drawn films of resin mixtures, and fiber nonwoven cloth composed of at least one kind of constituent material selected from the group consisting of cellulose, polyester, polyethylene, and polypropylene.

In the wound electrochemical device 1, the wound body constituted by the positive electrode 10, negative electrode 20, and separator 30 has the maximum longitudinal length L of about 16 to 18 mm, the maximum lateral length H of about 1.0 to 1.3 mm, and the width W of about 13.5 to 15 mm.

Each of the current collectors 10a, 20a constituting the positive and negative electrodes 10, 20 has a thickness of about 20 μm, each of the active material layers 10b, 20b has a thickness of about 18 to 50 μm, the separator 30 has a thickness of about 24 μm, and each of the leads 11, 21 has a thickness of about 80 to 100 μm.

With reference to FIG. 3, the structures of the positive and negative electrode leads 11, 21 and thereabout in the wound electrochemical device 1 will now be explained in further detail.

As illustrated in FIG. 3, the current collector 10a of the positive electrode 10 is formed with the exposed part 10c free of the active material layer 10b. The exposed part 10c includes a connection area 10d for connecting with the positive electrode lead 11 and an open area 10e adjacent to the connection area 10d. The open area 10e is formed on both sides of the connection area 10d for connecting with the positive electrode lead 11 so as to hold the connection area 10d. Similarly, the current collector 20a of the negative electrode 20 is formed with the exposed part 20c free of the active material layer 20b. The exposed part 20c includes a connection area 20d for connecting with the negative electrode lead 21 and an open area 20e adjacent to the connection area 20d. The open area 20e is formed on both sides of the connection area 20d for connecting with the negative electrode lead 21 so as to hold the connection area 20d.

The exposed part 10c of the positive electrode 10 and the exposed part 20c of the negative electrode 20 are disposed at respective positions opposing each other through the separator 30. The positive electrode lead 11 is connected to the connection area 10d in the exposed part 10c, while the negative electrode lead 21 is connected to the connection area 20d in the exposed part 20c. As a result, the positive and negative electrode leads 11, 21 are arranged so as to abut against the single-layer separator 30 through the respective protective tapes 12, 22 when seen in a cross section (the surface illustrated in FIGS. 2 and 3) perpendicular to the winding axis.

In the exposed part 10c in the positive electrode 10, the open area 10e is disposed at a position opposing the negative electrode lead 21 through the single-layer separator 30 when seen in a cross section perpendicular to the winding axis. The width of the open area 10e is made greater than that of the negative electrode lead 21. More specifically, in FIG. 3, the width of the open area 10e is greater than the sum of two times the thickness of the separator 30 and the width of the negative electrode lead 21 on the right side of the connection area 10d and greater than the thickness of the separator 30 on the left side of the connection area 10d. The negative electrode lead 21 abuts against the open area 10e through the single-layer separator 30. That is, the width of the exposed part 10c of the positive electrode 10 (the sum of the width of the connection area 10d and the width of the open area 10e) is greater than the sum of the width of the positive electrode lead 11, the width of the negative electrode lead 21, and three times the thickness of the separator 30. When the area formed on the left side of the connection area 10d (the area on the side opposite from the area opposing the negative electrode lead 21) in the open area 10e in FIG. 3 has only substantially the same width as that of the separator 30, the positive electrode lead 11 connected to the connection area 10d and the active material layer 10b formed on the left side of the open area 10e may come close to each other so that substantially no open area exists.

Similarly, in the exposed part 20c in the negative electrode 20, the open area 20e is disposed at a position opposing the positive electrode lead 11 through the single-layer separator 30 when seen in a cross section perpendicular to the winding axis. The width of the open area 20e is made greater than that of the positive electrode lead 11. More specifically, in FIG. 3, the width of the open area 20e is greater than the sum of two times the thickness of the separator 30 and the width of the positive electrode lead 11 on the left side of the connection area 20d and greater than the thickness of the separator 30 on the right side of the connection area 20d. The positive electrode lead 11 abuts against the open area 20e through the single-layer separator 30. That is, the width of the exposed part 20c of the negative electrode 20 (the sum of the width of the connection area 20d and the width of the open area 20e) is greater than the sum of the width of the positive electrode lead 11, the width of the negative electrode lead 21, and three times the thickness of the separator 30. When the area formed on the right side of the connection area 20d (the area on the side opposite from the area opposing the positive electrode lead 11) in the open area 20e in FIG. 3 has only substantially the same width as that of the separator 30, the negative electrode lead 21 connected to the connection area 20d and the active material layer 20b formed on the right side of the open area 20e may come close to each other so that substantially no open area exists.

In the wound electrochemical device 1, as mentioned above, the positive electrode lead 11 opposes the open area 20e of the negative electrode 20 through the separator 30, while the positive electrode lead 11, separator 30, and current collector 20a abut against one another. The negative electrode lead 21 opposes the open area 10e of the positive electrode 10 through the separator 30, while the negative electrode lead 21, separator 30, and current collector 10a abut against one another. As a result, as illustrated in FIG. 3, the separator 30 is held among the current collectors 10a, 20a, positive electrode lead 11, and negative electrode lead 21 while curving substantially like letter S. In the wound electrochemical device 1, the separator 30 disposed between the positive and negative electrode leads 11, 21 is soft enough to be deformable according to the forms of the positive and negative electrode leads 11, 21. From the viewpoint of softness, it is preferable for the separator 30 disposed between the positive and negative electrodes 11, 21 to be of a single layer as in the wound electrochemical device 1 of this embodiment. However, the separator held between the positive and negative electrodes 11, 21 is not limited to the single layer as long as it is soft enough to be deformable according to the forms of the positive and negative electrodes 11, 21.

In the wound electrochemical device 1 of this embodiment, the exposed part 10c on the positive electrode 10 side and the exposed part 20c on the positive electrode 20 side have the same form. The cross sections of the positive and negative electrode leads 11, 21 also have the same form. As a result, when seen in the vertical direction of FIG. 3 (the thickness direction of the wound electrochemical device 1), the exposed parts 10c, 20c are arranged so as to be just overlaid on each other, the open area of one exposed part opposes the lead connected to the connection area of the other exposed part, and they are in close contact with each other in the vertical direction as illustrated in FIG. 3. The wound electrochemical device 1 in accordance with this embodiment has such a structure and thus can efficiently utilize the area formed with the active material layers 10b, 20b in order to secure the capacity of the device, thereby inhibiting the device from lowering the capacity.

In the negative electrode 20, the active material layer 20b is also partly removed from the rear face of the open area 20e of the exposed part 20c. Specifically, the active material layer 20b is removed from the area opposing the negative electrode lead 21 through the current collector 20a, so as to expose the current collector 20a, while the insulating tape 22 is attached to this area. The active material layer 20b may be left unremoved on the rear side of the negative electrode lead 21.

Figure 4:
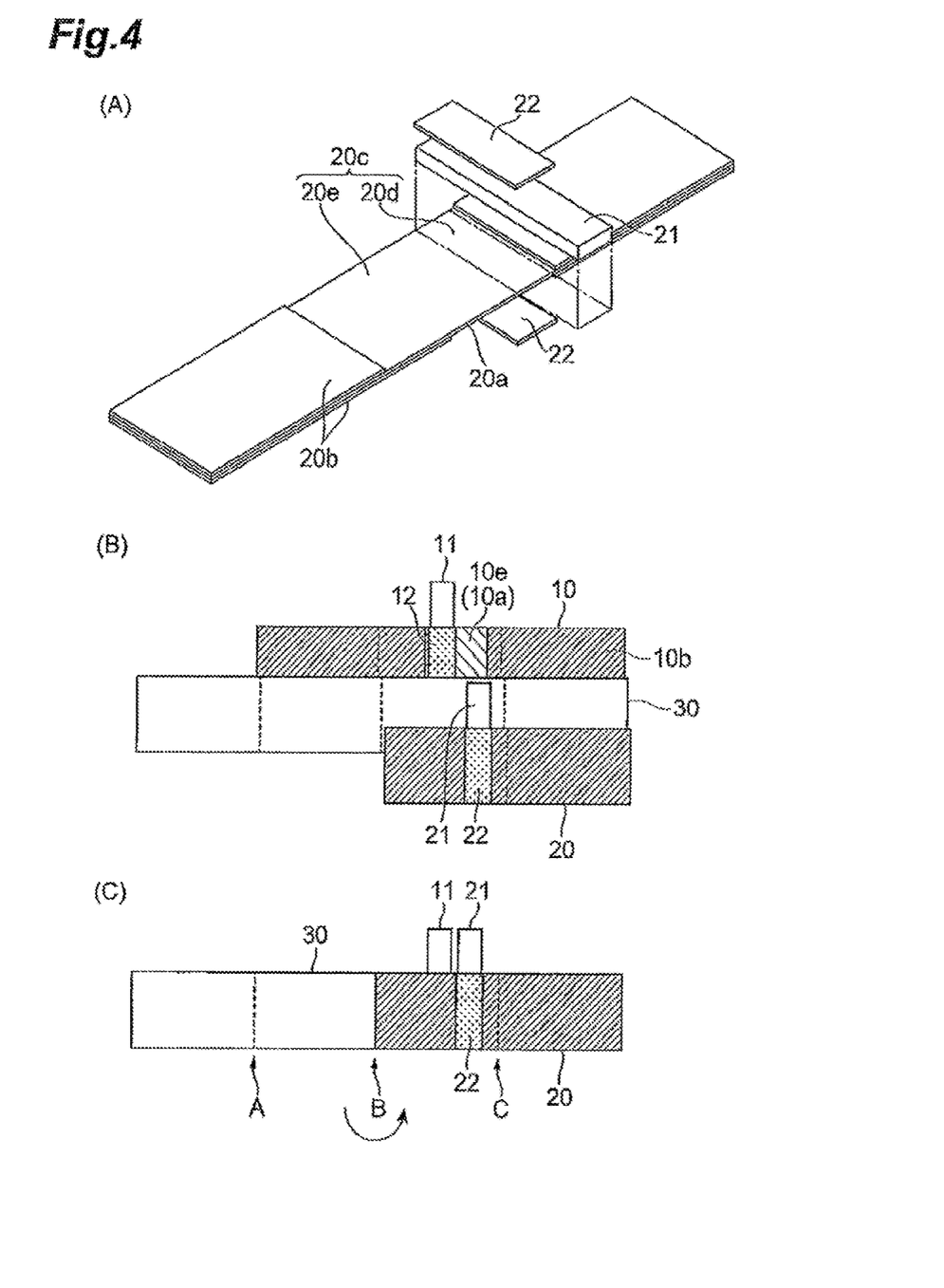
FIG. 4 is a diagram illustrating a part of a manufacturing process of the wound electrochemical device depicted in FIG. 1.
Figure 5:
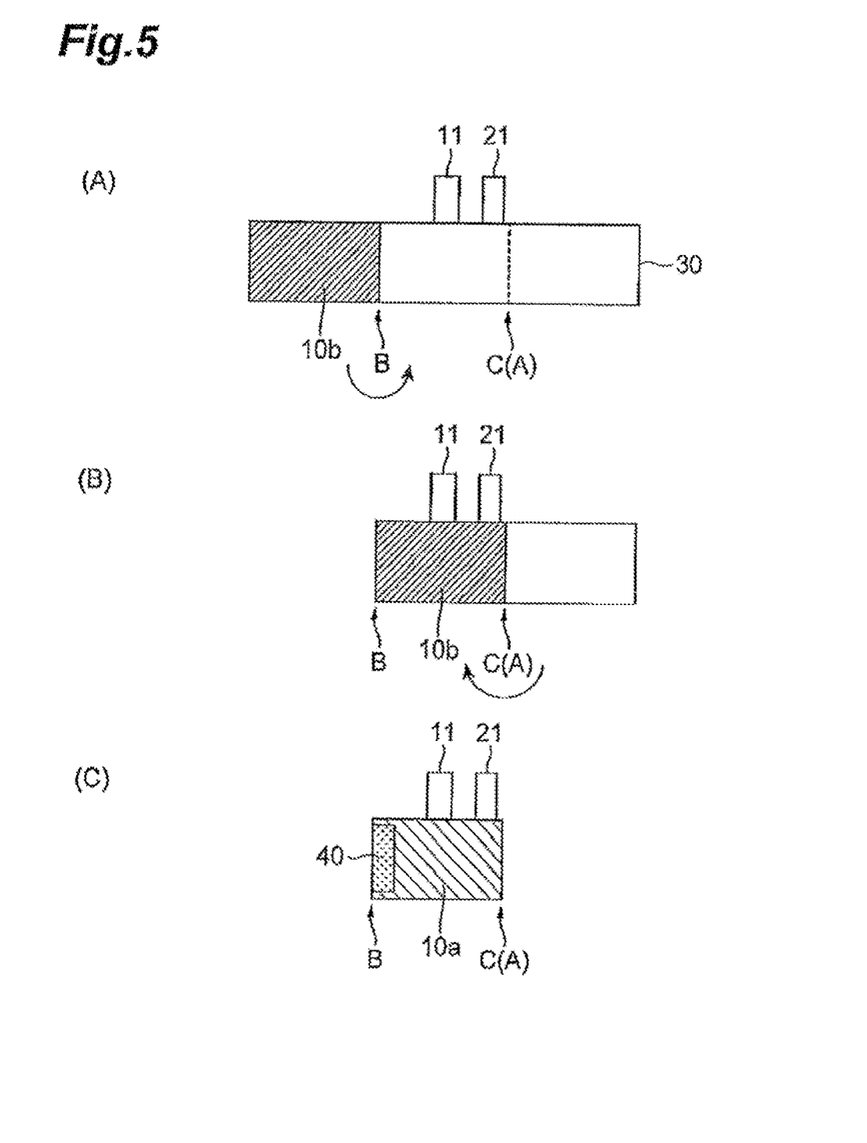
FIG. 5 is a diagram illustrating a part of the manufacturing process of the wound electrochemical device depicted in FIG. 1.

A method of manufacturing the wound electrochemical device 1 will now be explained with reference to FIGS. 4 and 5. The wound electrochemical device 1 is formed by winding the band-like positive electrode 10, negative electrode 20, and separator 30 one by one.

First, both faces of current collectors constituting the band-like positive and negative electrodes 10, 20 are covered with active materials to become active material layers, and leads are attached thereto. FIG. 4(A) illustrates, in an exploded perspective view, the current collector 20a to become the negative electrode 20 having both faces formed with the active material layers 20b, the negative electrode lead 21, and the insulating tapes 22. The current collector 20a is not completely covered with the active material layers 20b on both faces, but such that the area to become the exposed part 20c constituted by the connection area 20d and open area 20e and the rear side of the area to which the negative electrode lead 21 is attached are exposed to the outside. Thereafter, the negative electrode lead 21 is attached thereto by ultrasonic welding, and the insulating tape 22 is affixed so as to cover the negative electrode lead 21. The insulating tape 22 is also affixed to the area exposing the current collector 20a on the rear side of the negative electrode lead 21. This yields the band-like negative electrode 20 connected to the negative electrode lead 21. The band-like positive electrode 10 connected to the positive electrode lead 11 is manufactured by the same method as with the negative electrode 20. In the positive electrode 10, however, the active material layer 20b is not formed in the area where the active material layer 10b is the outermost layer on the surface opposite from the surface where the positive electrode lead 11 is attached, whereby the current collector 10a is exposed by a greater area than is the current collector 20a of the negative electrode 20.

Next, as illustrated in FIG. 4(B), the separator 30 is held between the band-like positive and negative electrodes 10, 20. Here, as illustrated in FIG. 4(B), the positive and negative electrodes 10, 20 are arranged such that the open regions 10e, 20e (not depicted) oppose each other through the separator 30. FIG. 4(B) illustrates the rear side of the surface of the negative electrode 20 connected to the negative electrode lead 21. As a consequence, the positive electrode lead 11 with the open area 10e, the separator 30, and the negative electrode lead 21 with the open area 20e are arranged in this order from the current collector 10a to the current collector 20a in the area held between the current collectors 10a, 20a. Vertically extending broken lines in FIG. 4(B) indicate positions to become folds when winding the positive electrode 10, negative electrode 20, and separator 30 flatly. Then, as illustrated in FIG. 4(C), the positive electrode 10, negative electrode 20, and separator 30 are overlaid on top of one another.

Subsequently, as illustrated in FIG. 5(A), the part of the separator 30 on the left side of a fold B in FIG. 4(C) is folded on the right side along the fold B. As a consequence, the separator 30 is folded such that folds C, A are overlaid on each other, whereby both faces of the negative electrode 20 are held by the separator 30 on the right side of the depicted fold B.

Then, as illustrated in FIG. 5(B), the positive electrode 10 is folded on the right side along the fold B. This layers the positive electrode 10 on the front side of the separator 30 between the folds B, C.

Further, as illustrated in FIG. 5(C), all of the layered parts (the separator 30, negative electrode 20, separator 30, and positive electrode 10 in this order from the front side) on the right side of the fold C (A) are folded on the left side. Consequently, as illustrated in FIG. 5(C), the separator 30, negative electrode 20, separator 30, and positive electrode 10 are layered in this order from the rear side to front side in the drawing. End parts of the positive electrode 10, separator 30, and negative electrode 20 which are located at the depicted left end (the side end part of the fold B) are fixed with an adhesive tape 40.

The foregoing method manufactures the wound electrochemical device 1 illustrated in FIGS. 1 and 2. As in the above, the method of manufacturing a wound electrochemical device in accordance with this embodiment does not require a core or the like, whereby the wound body is prevented from being deformed when removing the core and so forth.

When the wound electrochemical device 1 is used as an electric double-layer capacitor, for example, the wound electrochemical device 1 and an electrolytic solution are sealed in an outer case (not depicted) while exposing the positive and negative electrode leads 11, 21 to the outside. When necessary, a plurality of wound electrochemical devices can be used in a stacked state.

As in the foregoing, in the area where the positive and negative electrode leads 11, 21 oppose each other in the wound electrochemical device 1 of this embodiment, the active material layers are removed from the surfaces of the current collectors 10a, 20a, so as to form the open areas 10e, 20e. Even if the active material layers are formed on the surfaces of the current collectors, surfaces opposing them through the separator are provided with the leads protected by the insulating tapes, whereby the areas serving as the open areas originally have no function as a capacitor. Therefore, by removing the active material layers from areas having no function as a capacitor, the wound electrochemical device 1 in accordance with this embodiment can be made further thinner while inhibiting the capacity as a device from lowering.

In the wound electrochemical device 1 of this embodiment, the active material layers are formed on both sides of the band-like positive and negative electrode leads. That is, the leads are connected to the respective band-like current collectors not at their end parts but near their centers. This can minimize the length of current paths throughout the electrodes, so as to suppress the resistance value as compared with the case where the leads are connected to the end parts of the current collectors.

In the wound electrochemical device 1 of this embodiment, the cross section perpendicular to the winding axis of the separator 30, i.e., the cross section illustrated in FIG. 2, is flat, while the exposed parts 10c, 20c of the positive and negative electrodes 10, 20 oppose each other through the single-layer separator 30 extending longitudinally of the cross section. This makes it easier to change the form of the separator 30 held between the positive and negative electrode leads 11, 21 connected to their corresponding exposed parts 10c, 20c according to their forms, whereby the thickness of the wound electrochemical device 1 (the length in the vertical direction that is the lateral direction in the cross section illustrated in FIG. 2) can be made smaller.

Though one embodiment of the present invention has been explained in the foregoing, the present invention can be modified in various ways without being restricted to the above-mentioned embodiment.

For example, while the above-mentioned embodiment explains a wound electrochemical device having a flat cross section, the present invention is also applicable to devices whose cross-sectional forms are not flat, e.g., devices having a substantially circular cross section.

While above-mentioned embodiment mainly explains a case where the wound electrochemical device is used as an electric double-layer capacitor, the wound electrochemical device in accordance with this embodiment can also be used for other purposes such as secondary batteries based on lithium ions or others and lithium capacitors, for example. It is also employable in all-solid-state batteries replacing the electrolytic solution with a solid electrolyte as well as magnesium ion batteries and calcium ion batteries. In this case, materials such as active materials used for the active material layers are selected as appropriate according to their purposes.

The method of manufacturing the wound electrochemical device is not limited to the method explained in the above-mentioned embodiment. In particular, the positive electrode, negative electrode, and separator can be wound not only by the above-mentioned method, but also by other methods. Here, depending on the winding method, end parts of the separator (and positive and negative electrodes) may be disposed at a plurality of locations of the wound body. In this case, attaching adhesive tapes to a plurality of locations can fix the separator and positive and negative electrodes. Though a case where all the surfaces of the positive and negative electrode leads are connected to their corresponding band-like current collectors in their lateral direction is explained, only a part of the current collectors in the lateral direction may connect with the leads. The positions where the active layers are disposed on the current collector surfaces can be changed as appropriate according to the methods of using and manufacturing (winding) the wound electrochemical device.

Though the above-mentioned embodiment explains a case where the positive electrode is provided as the outermost layer in the wound state, effects similar to those of the above-mentioned embodiment can also be obtained when the positive and negative electrodes are replaced with each other.

What is claimed is:

1. A wound electrochemical device comprising:
   a band-shaped first electrode;
   a band-shaped second electrode; and
   a band-shaped separator, the first and second electrodes being wound and overlaid such as to hold the separator therebetween;
   the band-shaped first electrode having:
      a first current collector having a length, a width, and a thickness, wherein:
         the length of the first current collector is in a direction of winding of the first current collector;
         the width of the first current collector is in a direction parallel to a winding axis of the wound electrochemical device, and orthogonal to the length direction of the first current collector; and
         the thickness of the first current collector is in a direction that is within a plane that is perpendicular to the winding axis of the wound electrochemical device, and orthogonal to the length and width directions of the first current collector;
      a first active material layer on at least a portion of each of two opposing major sides of the first current collector that are defined by the length and width directions of the first current collector, and
      a first lead connected to a first exposed part of the first current collector that is free of the first active material layer, a width of the first lead at an area that the first lead is connected to the first current collector being in a direction substantially parallel to the length direction of the first current collector at the area that the first lead is connected to the first current collector;
   the band-shaped second electrode having:
      a second current collector having a length, a width, and a thickness, wherein:
         the length of the second current collector is in a direction of winding of the second current collector;
         the width of the second current collector is in a direction parallel to a winding axis of the wound electrochemical device, and orthogonal to the length direction of the second current collector; and
         the thickness of the second current collector is in a direction that is within a plane that is perpendicular to the winding axis of the wound electrochemical device, and orthogonal to the length and width directions of the second current collector;
      a second active material layer on at least a portion of each of two opposing major sides of the second current collector that are defined by the length and width directions of the second current collector, and a second lead connected to a second exposed part of the second current collector free of the second active material layer, a width of the second lead at an area that the second lead is connected to the second current collector being in a direction substantially parallel to the length direction of the second current collector at the area that the second lead is connected to the second current collector;

wherein:

the first lead and the second lead abut against opposing surfaces of the separator through respective protective tapes;

the first exposed part has:
  a length direction parallel to the length direction of the first current collector at the first exposed part;
  opposing first and second ends in the length direction of the first exposed part, the first and second ends of the first exposed part abutting respective portions of the first active material layer;
  a first connection area connected to the first lead;
  a first open area adjacent to the first connection area in the length direction of the first exposed part, a length of the first open area as measured in the length direction of the first exposed part is greater than the width of the second lead;

the second exposed part has:
  a length direction parallel to the length direction of the second current collector at the second exposed part;
  opposing first and second ends in the length direction of second exposed part, the first and second ends of the second exposed part abutting respective portions of the second active material layer;
  a second connection area connected to the second lead;
  a second open area adjacent to the second connection area in the length direction of the second exposed part, a length of the second open area as measured in the length direction of the second exposed part area is greater than the width of the first lead;

the first and second exposed parts oppose each other through the separator;

the first lead opposes the second open area of the second exposed part through the separator;

the second lead opposes the first open area of the first exposed part through the separator;

the first and second leads are adjacent to each other in respect to the length direction of the first current collector, and are positioned between an outermost winding of the first current collector and an outermost winding of the second current collector;

a current collector is not interposed between the first and second leads; and the number of separator layers interposed between the first and second leads is one.

2. The wound electrochemical device according to claim 1, wherein:

the first and second exposed parts delimit an area that intervenes between the first and second exposed parts, the intervening area having:
  a longitudinal direction that is substantially parallel to the length direction of the first and second exposed parts, and
  a height direction that is substantially perpendicular to the longitudinal direction of the intervening area and substantially parallel to the thickness direction of the first and second current collectors at the first and second exposed parts;

a portion of the first lead and a portion of the second lead are contained within the intervening area, arranged adjacent to each other in the longitudinal direction of the intervening area; and only one or more selected from the group consisting of:
  a single separator layer,
  the first lead portion or the second lead portion, and
  one of the respective protective tapes, intervene in the height direction of the intervening area between the first and second exposed parts throughout the longitudinal direction of the intervening area.

* * * * *